(12) United States Patent
Tow (10) Patent No.: US 6,575,048 B1
(45) Date of Patent: Jun. 10, 2003

(54) SENSOR POSITIONING ASSEMBLY

(75) Inventor: John P. Tow, Douglasville, GA (US)

(73) Assignee: Parker-Hannifin Corporation, Cleveland, OH (US)

(*) Notice: Subject to any disclaimer, the term of this patent is extended or adjusted under 35 U.S.C. 154(b) by 0 days.

(21) Appl. No.: 09/565,659

(22) Filed: May 5, 2000

Related U.S. Application Data (60) Provisional application No. 60/163,970, filed on Nov. 8, 1999.

(51) Int. Cl.$^7$ ............................................. G01D 21/00
(52) U.S. Cl. .................................... 73/866.5; 73/756
(58) Field of Search ................................ 73/866.5, 756

(56) References Cited

U.S. PATENT DOCUMENTS

| | | | |
|---|---|---|---|
| 4,245,815 A | | 1/1981 | Willis |
| 4,388,502 A | * | 6/1983 | Cohn ........................ 179/179 |
| 4,576,049 A | | 3/1986 | Kohnlechner |
| 4,638,668 A | * | 1/1987 | Leverberg et al. ......... 73/866.5 |
| 4,821,585 A | * | 4/1989 | Kempe ...................... 73/63.23 |
| 4,858,470 A | | 8/1989 | Kincaid et al. |
| 4,899,586 A | * | 2/1990 | Koneval et al. ............. 73/431 |
| 4,922,754 A | | 5/1990 | Horne et al. |
| 4,942,763 A | | 7/1990 | Harpster |
| 5,015,194 A | | 5/1991 | Seas |
| 5,095,517 A | | 3/1992 | Monguzzi et al. |
| 5,228,338 A | | 7/1993 | Saghatchi |
| 5,253,520 A | | 10/1993 | Drexel et al. |
| 5,379,658 A | * | 1/1995 | Lichtenfels, II et al. ... 73/866.5 |
| 5,528,941 A | | 6/1996 | Ogawa |
| 5,855,397 A | | 1/1999 | Black et al. |
| 5,954,940 A | * | 9/1999 | Zdunek et al. ........... 205/776.5 |
| 5,997,739 A | * | 12/1999 | Clausen et al. ............. 210/232 |
| 6,062,095 A | * | 5/2000 | Mulrooney et al. ........ 73/866.5 |
| 6,170,345 B1 | * | 1/2001 | Kerner ....................... 73/866.5 |

OTHER PUBLICATIONS

Parker–Hannifin Corporation, Instrumentation Valve Division, Bulletin 4126, Revised Apr. 1996 entitled "Parker Instrumentation Rotary Plug Valve".

Turck Inc., DC Self Contained Flow Monitors.

* cited by examiner

*Primary Examiner*—Helen Kwok
*Assistant Examiner*—C D Garber
(74) *Attorney, Agent, or Firm*—John A. Molnar, Jr.

(57) ABSTRACT

Positioning assembly for positioning a sensor in a body having an environment contained therein. The assembly includes generally-annular adapter and fastening members. The adapter member is provided as extending intermediate an upper first end and a lower second end, and further as having an inner surface configured for a threaded engagement with an externally-threaded terminal portion of the sensor, and an outer surface including a bearing portion. The annular fastening member has an inner surface receivable coaxially over the outer surface of the adapter member and an outer surface configured for a threaded engagement an opening formed within a wall of the body. With the fastening member being received over the adapter member and the adapter member being threadably engaged with the sensor terminal portion, the fastening member is threadably engagable with the body wall opening for movement into an abutting, force-transmitting contact with the bearing portion of the adapter member. Such contact urges the second end of the adapter member into a compressive engagement with an axial surface of the body wall opening and thereby positions the sensor at a select angular orientation. Prior to the compressive engagement of the adapter member with the opening axial surface, the sensor is rotatable about a longitudinal axis thereof for its positioning at the selected angular orientation.

21 Claims, 4 Drawing Sheets

SENSOR POSITIONING ASSEMBLY

RELATED CASES

The present application claims priority to U.S. Provisional Application Serial No. 60/163,970; filed Nov. 8, 1999.

BACKGROUND OF THE INVENTION

The present invention relates generally to an assembly for positioning a sensor in a body having an environment contained therein, and more particularly to an assembly for use with a sensor of a variety including an elongate terminal portion receivable through a wall of the body which assembly allows the sensor to be positioned at a select angular orientation.

Sensors are used in a variety of manufacturing and process applications to measure and control such parameters as fluid flow rate, pressure, temperature, displacement or distance, velocity, and acceleration. Within these applications, sensors typically are provided to supply an analog or digital output signal proportional to the parameter being measured. For that purpose, sensors may be constructed as having a signal processor or other electronics contained within one end of a housing, and a transducer or other sensing device contained within the other end which may be configured as an elongate probe. The installation of sensors of such type involves receiving the probe end thereof through an opening provided within a wall of a pipe, manifold, vessel, housing, or other body for the disposition of the sensing device in sensing contact with an environment contained within the body. The sensor processing end is disposed externally of the body for connection via a cable or the like to a data collector or controller, and in this regard is configured as having a threaded pin or other connector.

Sensors and mounting arrangements thereof are further described in U.S. Pat. Nos. 4,245,815; 4,576,049; 4,858,470; 4,922,754; 4,942,763; 5,015,194; 5,095,517; 5,228,338; 5,253,520; and 5,528,941. A commercial flow sensor of the type herein involved is marketed under the designation FCS-G1/4 by Turck, Inc. (Minneapolis, Minn.).

In a conventional mounting arrangement, the opening of the body wall is internally-threaded for a threaded engagement with an externally-threaded portion of the sensor probe end. With such an arrangement, however, the angular orientation of the probe is randomly determined as dependent upon the depth of the threads in the body opening and the extent to which the probe is engaged with those threads. Accordingly, situations arise wherein the orientation of the processing end connector is disposed at an inconvenient angular position which complicates the cable connection and, in the case of a bank of sensor, leads to non-parallel line runs which are disfavored for aesthetic reasons. The random angular positioning of the sensor, moreover, makes it difficult to control both the exposure and orientation of the probe end within the environment and, as a result, can deleteriously affect the sensitivity of the sensor.

In view of the foregoing, it will be appreciated that improved sensor mounting arrangements would be well-received by industry. Particularly, there exists a need for an improved mounting arrangement in applications involving flow sensors dictating a preferred probe radial orientation and/or axial exposure extent.

SUMMARY OF THE INVENTION

The present invention is directed broadly to a positioning assembly for positioning a sensor in a body having an environment contained therein, and more particularly to a positioning assembly for use with a sensor of a variety including an elongate terminal portion with a probe end receivable through a wall of the body. In accordance with the precepts of the present invention, such assembly allows the sensor to be positioned at select angular orientations facilitating electrical and other connections. When employed, for example, in conjunction with flow sensors having a specified radial orientation and/or axial exposure extent, such assembly, moreover, allows the sensor to be positioned for optimal sensitivity.

In basic construction, the positioning assembly of present invention includes a generally-annular adapter and an associated, generally-angular fastening member. The adapter is provided as extending intermediate an upper first end and a lower second end, and further as having an inner surface configured for a threaded engagement with the externally-threaded terminal portion of the sensor, and an outer surface including a bearing portion. The annular fastening member has an inner surface receivable coaxially over the outer surface of the adapter member and an outer surface configured for a threaded engagement an opening formed within a wall of the body. With the fastening member being received over the adapter and the adapter being threadably engaged with the sensor terminal portion, the fastening member is threadably engagable with the body wall opening for movement into an abutting, force-transmitting contact with the bearing portion of the adapter. Such contact urges the second end of the adapter member into a compressive and, preferably, fluid-tight sealing engagement with an axial surface of the body wall opening and thereby positions the sensor at a select angular orientation. Prior to the compressive engagement of the adapter member with the opening axial surface, however, the sensor is rotatable about a longitudinal axis thereof for its positioning at the selected angular orientation. In this way, the sensor may be positioned for reasons of aesthetics or performance at any angular orientation from 0° to 360° with sealing contact with the body being maintained.

Advantageously, the positioning assembly of the present invention also comprehends that the assembly adapter member may be sized to extend intermediate the first and second ends thereof to define a predetermined length. Such length may be varied for controlling the axial extent of the sensor probe end within the body environment without the need to reconfigure the sensor or body wall opening.

The present invention, accordingly, comprises the apparatus and method possessing the construction, combination of elements, and arrangement of parts and steps which are exemplified in the detailed disclosure to follow. Advantages of the invention includes a sensor positioning assembly which allows the sensor to be positioned at select angular orientations for facilitating electrical or other connections with a connector of the sensor, and/or for the facing the probe end thereof in any direction which may be specified by the sensor manufacturer. Additional advantages include an adapter which may be dimensioned to control the exposure of the sensor probe end within the working environment as also may be specified by the sensor manufacturer to ensure optimal sensitivity. These and other advantages will be readily apparent to those skilled in the art based upon the disclosure contained herein.

BRIEF DESCRIPTION OF THE DRAWINGS

For a fuller understanding of the nature and objects of the invention, reference should be had to the following detailed description taken in connection with the accompanying drawings wherein.

The drawings will be described further in connection with the following Detailed Description of the Invention.

DETAILED DESCRIPTION OF THE INVENTION

Certain terminology may be employed in the following description for convenience rather than for any limiting purpose. For example, the terms "forward," "rearward," "right," "left," "upper," and "lower" designate directions in the drawings to which reference is made, with the terms "inward," "inner," or "inboard" and "outward," "outer," or "outboard" referring, respectively, to directions toward and away from the center of the referenced element, the terms "radial" and "axial" referring, respectively, to directions or planes perpendicular and parallel to the longitudinal central axis of the referenced element, and the terms "downstream" and "upstream" referring, respectively, to locations relative to the fluid flow. Terminology of similar import other than the words specifically mentioned above likewise is to be considered as being used for purposes of convenience rather than in any limiting sense.

For the purposes of the discourse to follow, the precepts of the sensor positioning assembly of the invention herein involved are described in connection with the utilization of such assembly in the mounting of a flow sensor to a housing adapted for a compression or other connection within a fluid circuit. It will be appreciated, however, that aspects of the present invention may find application in the installation of other types of sensors in fluid circuits and other systems. Such other applications therefore should be considered to be expressly within the scope of the present invention.

Figure 1:
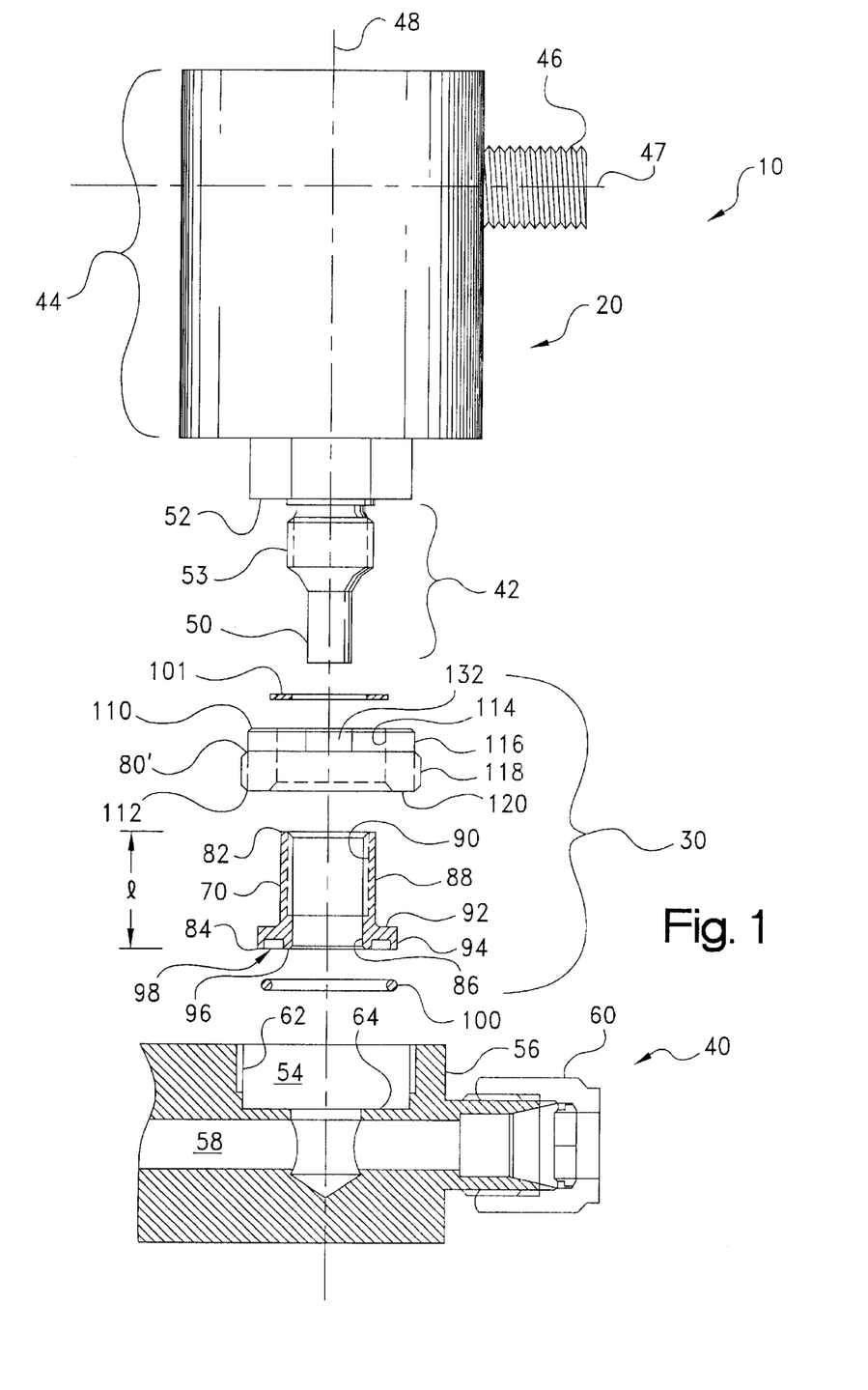
FIG. 1 is an exploded, partially cross-sectional view of a positioning assembly in accordance with the present invention for positioning a sensor in a body having an environment contained therein.

Referring then to the figures wherein corresponding reference characters are used to designate corresponding elements throughout the several views, shown generally at 10 in the exploded view of FIG. 1 is a combination in accordance with the present invention which includes a flow sensor, referenced generally at 20, and a positioning assembly, referenced generally at 30, for mounting the sensor 20 in a body such as the housing body referenced generally at 40. In the illustrated embodiment of FIG. 1, sensor 20 is shown to be a flow sensor such as a Type FCS-G1/4 manufactured by Turck, Inc. (Minneapolis, Minn.). Alternatively, sensor 20 may be provided as a pressure transducer, accelerometer, temperature sensor, LVDT, or any other sensor requiring mounting to a body in the manner to be described.

In basic construction, sensor 20 is of a variety including a lower, elongate terminal portion, referenced generally at 42, and an upper portion, referenced generally at 44, which may contain a signal process or other electronics. Electrical connection to such processor or electronics may be effected via a threaded or other pin connector, 46, which extends radially outwardly from the upper portion 44 along an axis, 47, which may be disposed generally perpendicular to the longitudinal axis, 48, of the sensor 20.

The terminal portion 42 of sensor 20 extends along longitudinal axis 48 from a lower probe end, 50, to an upper compression surface, 52, and is externally threaded, as at 53, intermediate probe end 50 and compression surface 52. Such probe end 50 is receivable through an opening, referenced at 54, formed through a wall, 56, of body 40 for disposition in fluid communication or other sensing contact with an environment, referenced at 58, contained within the body. Although body 40 is shown for illustrative purposes as a valve body or other housing having at least one end, 60, configured for a tubing connection within a fluid circuit, it will be appreciated that body 40 alternatively may be a pressure vessel, manifold, conduit, pipe, or the like. Body wall opening 54 is internally threaded as at 62, and includes an internally-disposed axial surface, 64.

In accordance with the present invention, positioning assembly 30 includes an adapter 70, and an associated fastening member, 80, both of which are generally annularly-shaped. As may be seen in FIG. 1, adapter 70 is aligned to extend coaxially along longitudinal axis 48 intermediate an upper first end, 82, and a lower second end, 84, and has an inner radial surface, 86, and an outer radial surface, 88. Inner radial surface 86 is configured as at 90 for a threaded engagement with the externally-threaded terminal portion 53 of the sensor. Outer surface 88 is configured at the adapter first end 82 as defining the outer diameter of adapter 70, and at the second end 84 as defining an upwardly-facing, axial bearing portion, 92. In the illustrated embodiment of FIG. 1, the bearing portion 92 is presented from a flange, 94, which extends radially-outwardly from the adapter at the second end 84 thereof.

Preferably, the adapter second end 84 also is configured to define an axially-oriented second end surface, 96, which includes an annular groove, referenced at 98, formed therein. A first annular seal member, 100, may be received within groove 94 for compression against the axial surface 64 of the body wall opening 54 effecting a fluid tight seal between the adapter 70 and the body environment 58. For effecting a fluid seal between adapter 70 and the sensor 20, a second annular seal member, 101, may be interposed between the sensor compression surface 52 and the adapter first end 82.

First seal member 100 preferably is provided as an O-ring which is formed of an elastomeric material such as a synthetic rubber. Such material specifically may be selected for temperature performance or otherwise for compatibility with the fluid being handled. Suitable materials include thermoplastic or thermosetting synthetic rubbers such as fluorocarbon, SBR, polybutadiene, EPDM, butyl, neoprene, nitrile, polyisoprene, silicone, fluorosilicone, buna-N, copolymer rubbers, or blends such as ethylene-propylene rubber. Second seal member 101 preferably is provided as a pressed-fiberboard gasket or other packing.

As was adapter 70, fastening member 80 is aligned similarly to extend coaxially along longitudinal axis 48 intermediate an upper end 110, and a lower end, 112, and has an inner surface, shown in phantom at 114, and an outer surface, 116. Inner surface 114 is configured to define an inner diameter of fastening member 80 which is receivable coaxial over the outer diameter of adapter 70. Outer surface 116 externally-threaded as at 118 for a threaded engagement with the internal threads 62 of the body wall opening 54.

In the illustrated embodiment of FIG. 1, the lower end 112 of fastening member is configured to define a downwardly-facing axial thrust surface, 120. As will be detailed hereinafter, thrust surface 120 is abuttingly engagable with the adapter bearing portion 92 to urge the second end 84 of the adapter into its compressive and, preferably, sealing engagement with the axial surface 64 of the body wall opening 54.

Figure 2:
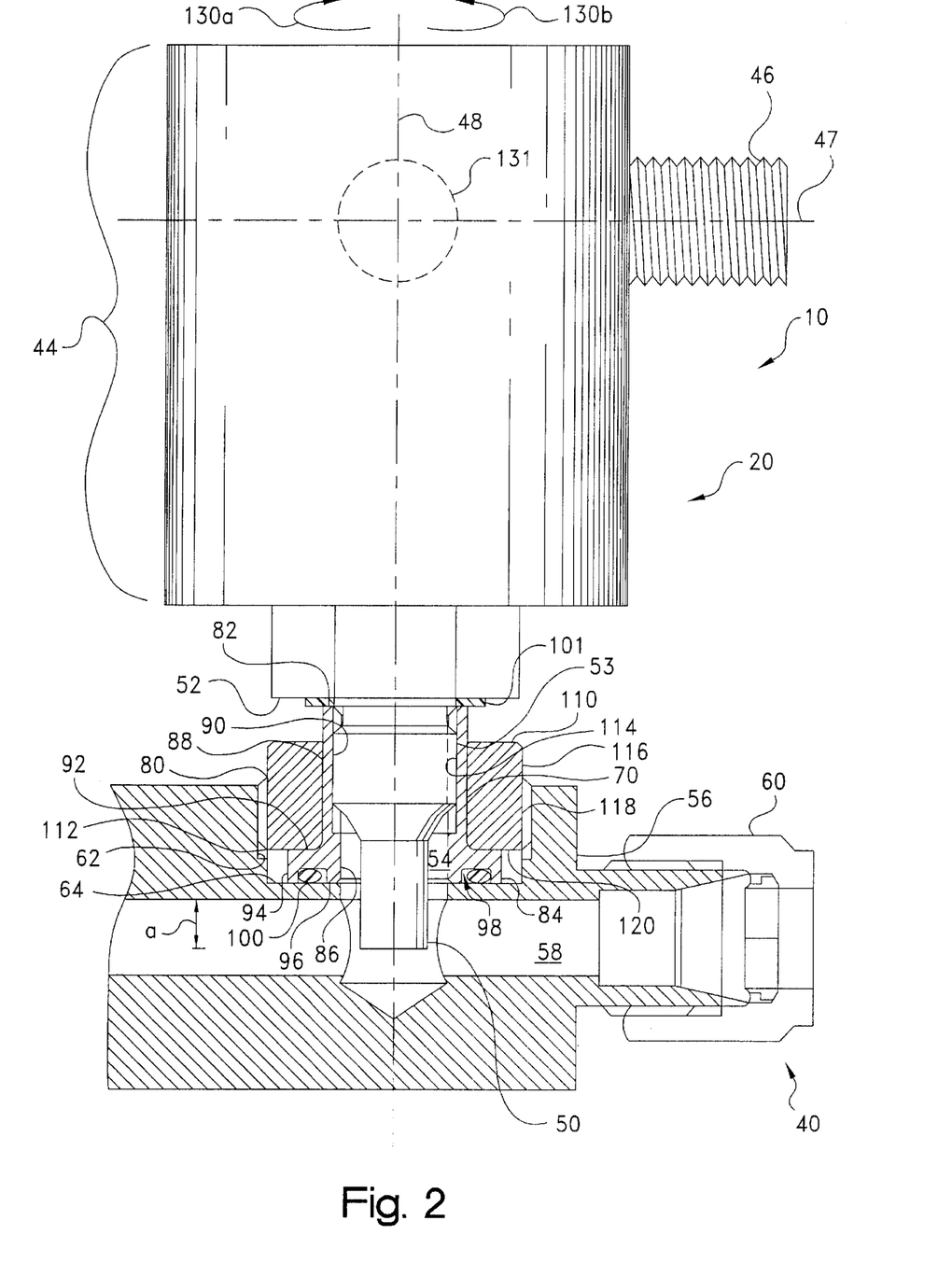
FIG. 2 is an assembled, cross-sectional view of the positioning assembly, sensor, and body of FIG. 1.

Turning next to FIG. 2, adapter 70 and fastening member 80 are shown as assembled for the mounting of sensor 20 in body 40. In this regard, with the fastening member 80 being received over adapter 70, the internally-threaded inner surface 86 of the adapter is threadably engaged with the externally-threaded terminal portion 42 of sensor 20. The axial travel of adapter 70 onto the sensor terminal portion 42 (See FIG. 1) is delimited by the abutting engagement of the adapter first end 82 against the sensor compression surface 52 with, preferably, seal 101 being sealingly compressed therebetween.

The assembly sequence continues with the externally-threaded outer surface 116 of fastening member 80 being loosely threadably engaged with the internally-threaded body wall opening 54. Advantageously, prior to the tightening of fastening member 80, sensor 20 is manually or otherwise rotatable within opening 54 for its positioning at a select angular orientation relative to axis 48. For example, sensor 20 may be rotated about axis 48 either clockwise in the direction indicated by arrow 130a, or counterclockwise in the direction indicated by arrow 130b, to position connector 46 at the angular orientation shown in phantom at 131 to facilitate the connection of a cable therewith. Alternatively, sensor 20 may be rotated to position the probe end 50 thereof at a select angular orientation relative to the direction of fluid flow though body 40 which orientation is specified for optimal sensor performance.

Once the desired alignment of sensor 20 has been attained, the assembly may be locked into place by further threadably engaging the fastening member 80 with the body wall opening 54. As fastening member 80 is tightened within opening 54, the movement of the fastening member thrust surface 120 into abutting, force-transmitting contact with the bearing portion 92 of the adapter 70. Such contact urges the adapter second end surface 96 into engagement with the axial surface 64 of the body wall opening 54 such that O-ring 100 is compressed therebetween providing a fluid-tight seal between adapter 70 and sensor 20. For the development of torque sufficient to tighten fastening member 80 within opening 54, the fastening member outer surface 116 may be configured above threads 118 as having flats, which may be seen at 132 in FIG. 1, formed therein for engagement with a wrench or other tool. Advantageously, the axial length, referenced at "l" in FIG. 1, of adapter 70 defined intermediate the first and second ends 82 and 84 thereof may be selected to position the probe end 50 at a predetermined axial exposure extent, referenced at "a" in FIG. 2, within the body environment 58.

Figure 3:
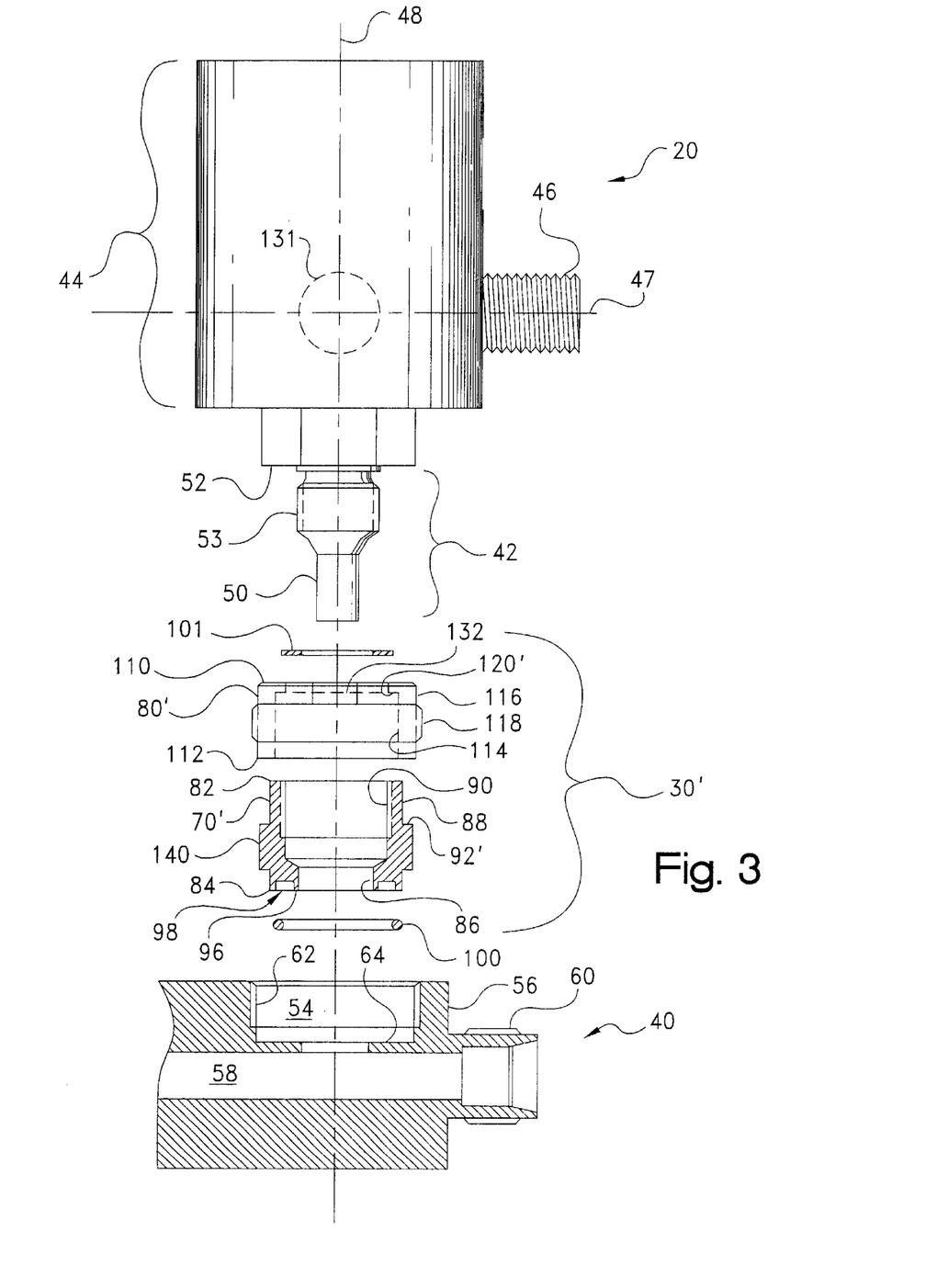
FIG. 3 is an exploded, partially cross-sectional view of an alternative embodiment of the positioning assembly of FIG. 1.

Looking next to FIG. 3, an alternative embodiment of positioning assembly 30 of the present invention reappears at 30'. As is shown at 70', adapter 70 is configured in such embodiment as having a radially-outwardly extending shoulder portion, 140, formed intermediate the first and second ends 82 and 84 of the adapter. Such shoulder portion 140 presents an upwardly-facing surface, 92', which in assembly 30' defines the axial bearing portion 92 (FIGS. 1 and 2) of the adapter 70'.

Figure 4:
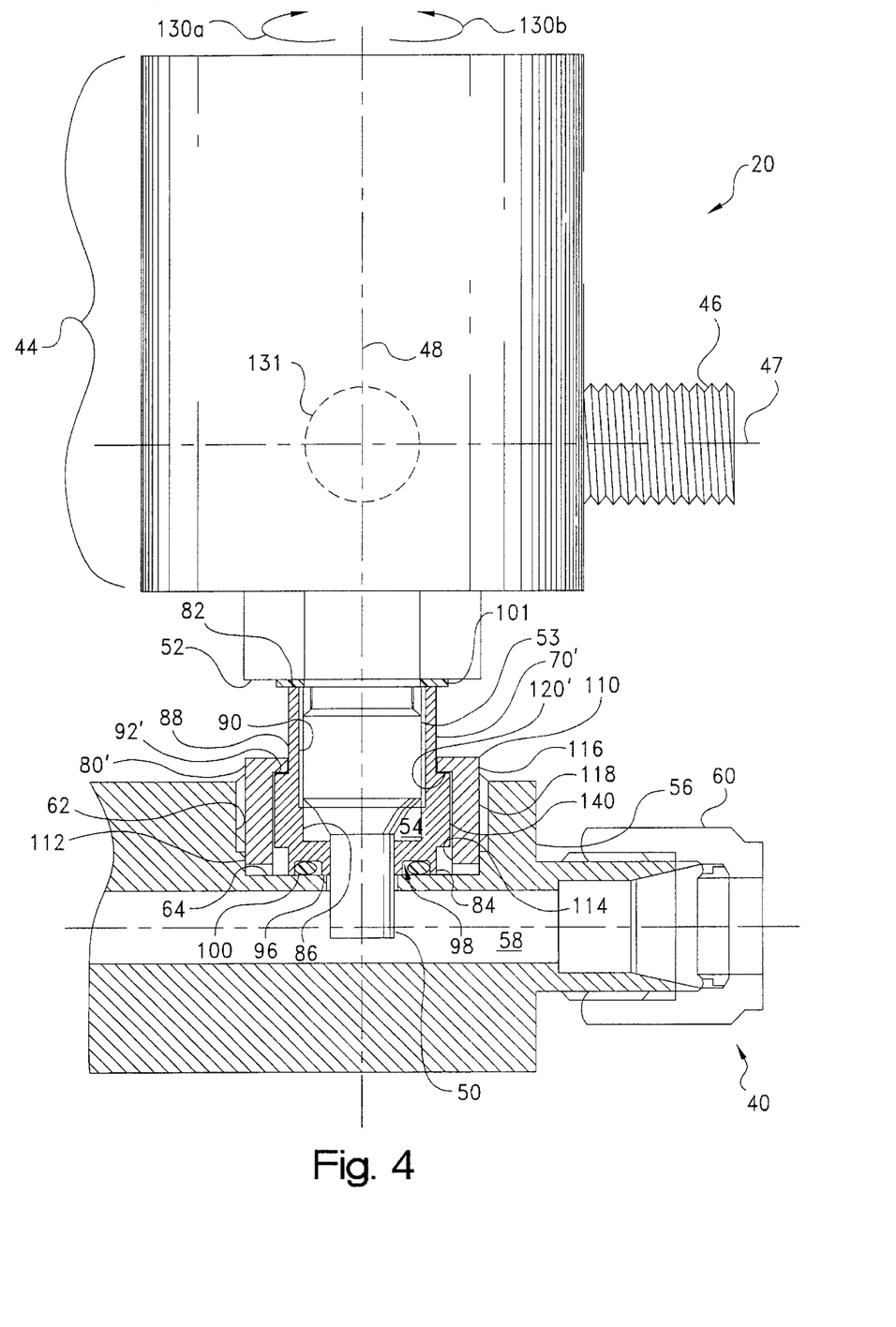
FIG. 4 is an assembled, cross-sectional view of the positioning assembly of FIG. 3.

Additionally in assembly 30', fastening member 80 is configured as is shown at 80' with the inner surface 114 thereof including a downwardly-facing surface portion, 120'. Such portion 120' functions as the corresponding axial thrust surface for adapter bearing portion 92'. As may be seen in the assembled view of FIG. 4, the thrust surface 120' is abuttingly engagable in force transmitting contact with the adapter bearing portion 92' to urge the second end 84 of the adapter into a compressive and, as before, preferably sealing engagement with the axial surface 64 of the body wall opening 54.

Thus, a unique arrangement for positioning a sensor in a body is described herein which allows the sensor to be positioned at select angular orientations facilitating electrical and other connections. When employed, for example, in conjunction with flow sensors having a specified radial orientation and/or axial exposure extent, such assembly also allows the sensor to be positioned for optimal sensitivity.

Unless otherwise specified, materials of construction for the adapter and fastening member of positioning assembly of the present invention are to be considered conventional for the uses involved. Such materials generally will be corrosion resistant, but particularly will depend upon the fluid or fluids being handled. A metal material such as a stainless steel or brass is preferred for durability, although other types of materials such as plastics may be substituted, however, again as selected for compatibility with the fluid being transferred or for desired mechanical properties.

As it is anticipated that certain changes may be made in the present invention without departing from the precepts herein involved, it is intended that all matter contained in the foregoing description shall be interpreted in as illustrative rather than in a limiting sense. All references cited herein are expressly incorporated by reference.

What is claimed is:

1. A positioning assembly for positioning a sensor in a body having an environment contained therein, the body having a wall with an internally-threaded opening including an internal axial surface, and the sensor being of a variety including an elongate terminal portion which extends along a longitudinal axis of the sensor from a lower probe end to an upper compression surface, the probe end being receivable through the opening of the body wall for disposition in sensing contact with the environment contained in the body, and the sensor terminal portion being externally-threaded intermediate the probe end and the compression surface, said positioning assembly comprising:

a generally annular adapter member extending intermediate an upper first end and a lower second end, said adapter member having an inner surface configured for a threaded engagement with the externally-threaded terminal portion of the sensor, and an outer surface including a bearing portion; and a generally annular fastening member having an inner surface receivable coaxially over the outer surface of said adapter member and an outer surface configured for a threaded engagement with the body wall opening, whereby with said fastening member being received over said adapter member and said adapter member being threadably engaged with the sensor terminal portion, said fastening member is threadably engagable with the body wall opening for movement into an abutting, force-transmitting contact with the bearing portion of said adapter member urging the second end of said adapter member into a compressive engagement with the axial surface of the body wall opening and positioning the sensor at a select angular orientation relative to its longitudinal axis, and whereby the sensor is rotatable about its longitudinal axis for the, positioning thereof at said select angular orientation prior to the compressive engagement of said adapter member with the body wall opening axial surface, wherein the probe end of the sensor is disposed at a predetermined angular orientation relative to the environment contained within said body, and wherein the sensor is rotated about its longitudinal axis to position the probe end thereof at said predetermined angular orientation prior to the compressive engagement of said adapter member with the body wall opening axial surface.

2. A positioning assembly for positioning a sensor in a body having an environment contained therein, the body having a wall with an internally-threaded opening including an internal axial surface, and the sensor being of a variety including an elongate terminal portion which extends along a longitudinal axis of the sensor from a lower probe end to an upper compression surface, the probe end being receivable through the opening of the body wall for disposition in sensing contact with the environment contained in the body, and the sensor terminal portion being externally-threaded intermediate the probe end and the compression surface, said positioning assembly comprising:

a generally annular adapter member extending to define a predetermined length intermediate an upper first end and a lower second end, said adapter member having an inner surface configured for a threaded engagement with the externally-threaded terminal portion of the sensor, and an outer surface including a bearing portion, and the adapter member first end being engagable with the compression surface of the sensor when said adapter member and the sensor are threadably engaged; and a generally annular fastening member having an inner surface receivable coaxially over the outer surface of said adapter member and an outer surface configured for a threaded engagement with the body wall opening, whereby with said fastening member being received over said adapter member and said adapter member being threadably engaged with the sensor terminal portion, said fastening member is threadably engagable with the body wall opening for movement into an abutting, force-transmitting contact with the bearing portion of said adapter member urging the second end of said adapter member into a compressive engagement with the axial surface of the body wall opening and positioning the sensor at a select angular orientation relative to its longitudinal axis and positioning the probe end of the sensor at a select axial extent within the body environment, and whereby the sensor is rotatable about its longitudinal axis for the positioning thereof at said select angular orientation prior to the compressive engagement of said adapter member with the body wall opening axial surface.

3. The positioning assembly of claim 2 further comprising an annular seal member interposable between the compression surface of the sensor and the first end of said adapter member for compression therebetween effecting a fluid tight seal between said adapter member and the compression surface of the sensor.

4. The positioning assembly of claim 1 or 2 wherein the second end of said adapter member defines an axial second end surface which includes an annular groove formed therein, and said positioning assembly further comprises an annular seal member received within said groove of said second end surface for compression against the axial surface of the body wall opening effecting a fluid tight seal between said adapter member and the body environment.

5. The positioning assembly of claim 1 or 2 wherein said fastening member has a lower end which defines an axial thrust surface, and wherein said thrust surface abuttingly contacts the bearing portion of said adapter member to urge the second end of said adapter member into said compressive engagement with the axial surface of the body wall opening.

6. The positioning assembly of claim 1 or 2, wherein the inner surface of said fastening member includes an axial thrust portion, and wherein said thrust surface abuttingly contacts the bearing portion of said adapter member to urge the second end of said adapter member into said compressive engagement with the axial surface of the body wall opening.

7. The positioning assembly of claim 1 or 2 wherein the sensor further includes an output connector, and wherein the sensor is rotatable about its longitudinal axis for the positioning of said connector at said select angular orientation prior to the compressive engagement of said adapter member with the body wall opening axial surface.

8. A sensor and positioning assembly for use in combination with a body having an environment contained therein, the body having a wall with an internally-threaded opening including an internal axial surface, and said assembly comprising:

a sensor including an elongate terminal portion which extends along a longitudinal axis of said sensor from a lower probe end to an upper compression surface, said probe end being receivable through the opening of the body wall for disposition in sensing contact with the environment contained in the body, said sensor terminal portion being externally-threaded intermediate said probe end and said compression surface;

a generally annular adapter member extending intermediate an upper first end and a lower second end, said adapter member having an inner surface configured for a threaded engagement with the externally-threaded terminal portion of said sensor, and an outer surface including a bearing portion; and a generally annular fastening member having an inner surface received coaxially over the outer surface of said adapter member and an outer surface configured for a threaded engagement with the body wall opening, whereby with said adapter member being threadably engaged with said sensor terminal portion, said fastening member is threadably engagable with the body wall opening for movement into an abutting, force-transmitting contact with the bearing portion of said adapter member urging the second end of said adapter member into a compressive engagement with the axial surface of the body wall opening and positioning said sensor at a select angular orientation relative to its longitudinal axis, and whereby said sensor is rotatable about its longitudinal axis for the positioning thereof at said select angular orientation prior to the compressive engagement of said adapter member with the body wall opening axial surface, wherein the probe end of said sensor is disposed at a predetermined angular orientation relative to the environment contained within said body, and wherein said sensor is rotated about its longitudinal axis to position the probe end thereof at said predetermined angular orientation prior to the compressive engagement of said adapter member with the body wall opening axial surface.

9. A sensor and positioning assembly for use in combination with a body having an environment contained therein, the body having a wall with an internally-threaded opening including an internal axial surface, and said assembly comprising:

a sensor including an elongate terminal portion which extends along a longitudinal axis of said sensor from a lower probe end to an upper compression surface, said probe end being receivable through the opening of the body wall for disposition in sensing contact with the environment contained in the body, said sensor terminal portion being externally-threaded intermediate said probe end and said compression surface;

a generally annular adapter member extending to define a predetermined length intermediate an upper first end and a lower second end, said adapter member having an inner surface configured for a threaded engagement with the externally-threaded terminal portion of said sensor, and an outer surface including a bearing portion, and the adapter member first end being engagable with the compression surface of said sensor when said adapter member and said sensor are threadably engaged; and a generally annular fastening member having an inner surface received coaxially over the outer surface of said adapter member and an outer surface configured for a threaded engagement with the body wall opening, whereby with said adapter member being threadably engaged and with said sensor terminal portion adapter member first end being engaged with the sensor compression surface, said fastening member is threadably engagable with the body wall opening for movement into an abutting, force-transmitting contact with the bearing portion of said adapter member urging the second end of said adapter member into a compressive engagement with the axial surface of the body wall opening and positioning said sensor at a select angular orientation relative to its longitudinal axis and positioning the probe end of said sensor at a select axial extent within the body environment, and whereby said sensor is rotatable about its longitudinal axis for the positioning thereof at said select angular orientation prior to the compressive engagement of said adapter member with the body wall opening axial surface.

10. The assembly of claim 9 further comprising an annular seal member interposable between the compression surface of said sensor and the first end of said adapter member for compression therebetween effecting a fluid tight seal between said adapter member and the compression surface of said sensor.

11. The assembly of claim 8 or 9 wherein the second end of said adapter member defines an axial second end surface which includes an annular groove formed therein, and said positioning assembly further comprises an annular seal member received within said groove of said second end surface for compression against the axial surface of the body wall opening effecting a fluid tight seal between said adapter member and the body environment.

12. The assembly of claim 8 or 9 wherein said fastening member has a lower end which defines an axial thrust surface, and wherein said thrust surface abuttingly contacts the bearing portion of said adapter member to urge the second end of said adapter member into said compressive engagement with the axial surface of the body wall opening.

13. The assembly of claim 8 or 9 wherein the inner surface of said fastening member includes an axial thrust portion, and wherein said thrust surface abuttingly contacts the bearing portion of said adapter member to urge the second end of said adapter member into said compressive engagement with the axial surface of the body wall opening.

14. The assembly of claim 8 or 9 wherein said sensor further includes an output connector, and wherein said sensor is rotatable about its longitudinal axis for the positioning of said connector at said select angular orientation prior to the compressive engagement of said adapter member with the body wall opening axial surface.

15. A method of positioning a sensor in a body having an environment contained therein, the body having an internally-threaded opening with an internal axial surface, the sensor being of a variety including an elongate terminal portion which extends along a longitudinal axis of the sensor from a lower probe end to an upper compression surface, the probe end being receivable through the opening of the body wall for disposition in sensing contact with the environment contained in said body, and the sensor terminal portion being externally-threaded intermediate the probe end and the compression surface, said method comprising the steps of:

(a) providing a positioning assembly comprising:

a generally annular adapter member extending intermediate an upper first end and a lower second end, said adapter member having an inner surface configured for a threaded engagement with the externally-threaded terminal portion of the sensor, and an outer surface including a bearing portion; and a generally annular fastening member having an inner surface received coaxially over the outer surface of said adapter member and an outer surface configured for a threaded engagement with the body wall opening, (b) threadably engaging the inner surface of the adapter member the terminal portion of said sensor;

(c) threadably engaging the outer surface of the fastening member with the opening of the body wall; and (d) rotating said sensor about its longitudinal axis to dispose said sensor at a select angular orientation relative thereto; and (e) further threadably engaging the fastening member with the body wall opening moving the fastening member into an abutting, force-transmitting contact with the bearing portion of the adapter member and urging the second end of said adapter member into a compressive engagement with the axial surface of the body wall opening positioning the sensor at said select angular orientation, wherein the probe end of said sensor is disposed at a predetermined angular orientation relative to the, environment contained within said body, and wherein said sensor is rotated in step (d) to position the probe end thereof at said predetermined angular orientation.

16. A method of positioning a sensor in a body having an environment contained therein, the body having an internally-threaded opening with an internal axial surface, the sensor being of a variety including an elongate terminal portion which extends along a longitudinal axis of the sensor from a lower probe end to an upper compression surface, the probe end being receivable through the opening of the body wall for disposition in sensing contact with the environment contained in said body, and the sensor terminal portion being externally-threaded intermediate the probe end and the compression surface, said method comprising the steps of:

(a) providing a positioning assembly comprising:
- a generally annular adapter member extending to a predetermined length intermediate an upper first end and a lower second end, said adapter member having an inner surface configured for a threaded engagement with the externally-threaded terminal portion of the sensor, and an outer surface including a bearing portion; and
- a generally annular fastening member having an inner surface received coaxially over the, outer surface of said adapter member and an outer surface configured for a threaded engagement with the body wall opening, (b) threadably engaging the inner surface of the adapter member with the terminal portion of said sensor such that the first end of said adapter member is engages the compression surface of said sensor;

(c) threadably engaging the outer surface of the fastening member with the opening of the body wall;

(d) rotating said sensor about its longitudinal axis to dispose said sensor at a select angular orientation relative thereto; and (e) further threadably engaging the fastening member with the body wall opening moving the fastening member into an abutting, force-transmitting contact with the bearing portion of the adapter member and urging the second end of said adapter member into a compressive engagement with the axial surface of the body wall opening positioning the sensor at said select angular orientation and positioning the probe end of the sensor at a select axial extent within the body environment, wherein the steps (a)–(e) are performed in the sequence set forth.

17. The method of claim 16 wherein said positioning assembly is provided in step (a) as further comprising an annular seal member interposed between the compression surface of said sensor and the first end of said adapter member for compression therebetween in step (e) effecting a fluid tight seal between said adapter member and the compression surface of said sensor.

18. The method of claim 15 or 16 wherein said positioning assembly is provided in step (a) with the second end of said adapter member defining an axial second end surface which includes an annular groove formed therein, and as further comprising an annular seal member received within said groove of said second end surface for compression in step (e) against the axial surface of the body wall opening effecting a fluid tight seal between said adapter member and the body environment.

19. The method of claim 15 or 16 wherein said positioning assembly is provided in step (a) with said fastening member having a lower end which defines an axial thrust surface, and wherein said thrust surface abuttingly contacts the bearing portion of said adapter member in step (e) to urge the second end of said adapter member into said compressive engagement with the axial surface of the body wall opening.

20. The method of claim 15 or 16 wherein said positioning assembly is provided in step (a) with the inner surface of said fastening member including an axial thrust portion, and wherein said thrust surface abuttingly contacts the bearing portion of said adapter member in step (e) to urge the second end of said adapter member into said compressive engagement with the axial surface of the body wall opening.

21. The method of claim 15 or 16 wherein said sensor further includes an output connector, and wherein said sensor is rotated in step (d) to position said connector at said select angular orientation.

* * * * *